(12) United States Patent
Willerton

(10) Patent No.: US 7,912,608 B2
(45) Date of Patent: *Mar. 22, 2011

(54) ARRANGEMENT FOR TRIGGERING A VEHICLE SAFETY DEVICE

(75) Inventor: Mark Willerton, Vadstena (SE)

(73) Assignee: Autoliv Development AB, Vargarda (SE)

( * ) Notice: Subject to any disclaimer, the term of this patent is extended or adjusted under 35 U.S.C. 154(b) by 1117 days.

This patent is subject to a terminal disclaimer.

(21) Appl. No.: 11/630,941

(22) PCT Filed: May 20, 2005

(86) PCT No.: PCT/SE2005/000742
§ 371 (c)(1),
(2), (4) Date: Dec. 27, 2006

(87) PCT Pub. No.: WO2006/004475
PCT Pub. Date: Jan. 12, 2006

(65) Prior Publication Data
US 2008/0059028 A1 Mar. 6, 2008

(30) Foreign Application Priority Data
Jun. 30, 2004 (GB) .................................. 0414675.9

(51) Int. Cl.
G06F 17/00 (2006.01)
(52) U.S. Cl. .......................... 701/45; 280/735; 180/282
(58) Field of Classification Search .................... 701/45; 340/436, 903
See application file for complete search history.

(56) References Cited

U.S. PATENT DOCUMENTS

| | | | | |
|---|---|---|---|---|
| 5,118,134 A | * | 6/1992 | Mattes et al. | 280/735 |
| 5,629,669 A | * | 5/1997 | Asano et al. | 340/436 |
| 5,835,007 A | | 11/1998 | Kosiak | |
| 5,936,549 A | | 8/1999 | Tsuchiya | |
| 6,271,747 B1 | | 8/2001 | Fendt et al. | |
| 6,487,482 B1 | | 11/2002 | Mattes et al. | |
| 2002/0091479 A1 | * | 7/2002 | Maruko et al. | 701/96 |
| 2002/0092693 A1 | * | 7/2002 | Breed | 180/282 |
| 2003/0030583 A1 | * | 2/2003 | Finn | 342/70 |
| 2003/0100983 A1 | | 5/2003 | Bullinger | |
| 2003/0149530 A1 | * | 8/2003 | Stopczynski | 701/301 |
| 2003/0225517 A1 | * | 12/2003 | Schiffmann | 701/301 |
| 2004/0007859 A1 | * | 1/2004 | Shields et al. | 280/735 |
| 2004/0034458 A1 | * | 2/2004 | Erb | 701/45 |
| 2005/0090950 A1 | * | 4/2005 | Sawamoto et al. | 701/23 |

FOREIGN PATENT DOCUMENTS

| | | |
|---|---|---|
| GB | 2 380 842 | 4/2003 |
| WO | WO 98/50254 | 11/1998 |

* cited by examiner

Primary Examiner — Khoi Tran
Assistant Examiner — Rodney King
(74) Attorney, Agent, or Firm — Brinks Hofer Gilson & Lione

(57) ABSTRACT

An arrangement for triggering a motor vehicle safety device. The arrangement incorporates a proximity sensor (1) which is configured to provide a proximity signal related to the distance to an object and/or the relative speed between the object and the sensor (1). The arrangement also includes an accelerometer (2) and a first processing unit (3) which is configured to perform an arming algorithm on signals received from the proximity sensor (1) and the accelerometer (2). A second processing unit (6) is provided to perform a crash algorithm on signals received from the proximity sensor (1) and the accelerometer (2). The arrangement incorporates a logic gate (4) to generate a triggering signal (5) in response to simultaneous output of signals from the first processing unit (3) and the second processing unit (6).

18 Claims, 1 Drawing Sheet

ARRANGEMENT FOR TRIGGERING A VEHICLE SAFETY DEVICE

CROSS REFERENCE TO RELATED APPLICATIONS

This application claims priority to GB 0414675.9, filed Jun. 30, 2004 and PCT/SE2005/000742, filed May 20, 2005.

FIELD OF THE INVENTION

The present invention relates to an arrangement for triggering a vehicle safety device such as, for example, an airbag or a pretensioner.

BACKGROUND OF THE INVENTION

To avoid inadvertent triggering of a safety device it has been proposed to utilise two units, namely an arming unit and a crash sensing unit, to produce, respectively, an arming signal and a crash signal, the safety device being triggered only when the arming signal and crash signal are present simultaneously. An arrangement of this type is intended to reduce the risk that a single mechanical or electrical error might lead to an inadvertent triggering of the safety device.

The arming unit may comprise a simple acceleration sensor which generates the arming signal if the acceleration exceeds a predetermined level. Alternatively the arming unit may include one or more sensors and a processing unit which performs a predetermined algorithm, the arming algorithm, on the signal or signals received from one or more sensors to provide the appropriate output.

The crash sensing unit may again comprise a simple acceleration sensor which generates a signal if the acceleration exceeds a predetermined level, but again the crash sensing unit may comprise one or more sensors associated with a processor which is configured to perform an algorithm, the crash algorithm, on the signal or signals received from one or more sensors to provide the appropriate output.

The crash sensing unit typically includes a sensor which is directionally sensitive, the sensitive direction of the accelerometer being aligned with the crash direction which is to be sensed by the sensor. The crash algorithm may be determined by whether or not the acceleration sensed by the accelerometer, acceleration "a" or its integrated value, Δv exceed a predetermined threshold.

It has been proposed to use the signal from a proximity sensor configured to provide an output related to the distance to an object and/or the relative speed between the object and the sensor, such as a doppler radar, to improve the ability to discriminate between different potential crashes, so as, for example, to discriminate between a potentially dangerous crash and a potentially not dangerous crash. If a doppler radar is utilised, the output represents the relative speed $v_{rel}$ between the sensor and a nearby obstacle.

It has been suggested, for example in U.S. Pat. No. 5,835,007, to utilise an anticipatory crash sensor of the radar type in conjunction with an accelerometer, with the threshold value of acceleration being calculated in dependence upon the signal from the anticipatory crash sensor.

Whilst a sophisticated arrangement incorporating a high number of sensors of different types may provide great accuracy in triggering a safety device at an appropriate instant, the provision of a large number of sensors leads to a relatively high cost.

The present invention seeks to provide an improved arrangement for triggering a vehicle safety device.

SUMMARY OF THE INVENTION

According to the present invention, there is provided an arrangement for triggering a vehicle safety device, the arrangement incorporating a proximity sensor configured to provide an output related to the distance to an object and/or the relative speed between the object and the sensor, and an accelerometer, the arrangement further comprising a first processing arrangement to perform a crash algorithm on signals received from the proximity sensor and the accelerometer, and a second processing arrangement to perform an arming algorithm, on signals received from the proximity sensor and the accelerometer, the arrangement incorporating a signal generator to generate a signal in response to simultaneous output of a signal from the first processing arrangement and a signal from the second processing arrangement.

Preferably, the first processing arrangement and the second processing arrangement are constituted by separate hardware units. In one embodiment of the invention, the first processing arrangement and the second processing arrangement are constituted by discrete hardware components. In another embodiment of the invention, the first processing arrangement and the second processing arrangement are constituted by integrated circuits.

Advantageously, the first processing arrangement and the second processing arrangement are each mounted on a respective printed circuit board.

In another embodiment the first processing arrangement and the second processing arrangement are constituted by separate software controlled processors. Conveniently, the proximity sensor is a radar sensor. In one embodiment, the radar is a Doppler radar sensor.

Advantageously, the accelerometer is sensitive to acceleration in a predetermined direction.

Preferably the processing sensor is oriented to determine the distance in a predetermined direction to an object.

Conveniently, the arrangement is mounted in a vehicle, with the said predetermined direction of the accelerometer being aligned with the longitudinal axis of the vehicle.

Alternatively, the arrangement may be mounted in a vehicle, with the predetermined direction of the accelerometer being parallel with the lateral axis of the vehicle.

Conveniently, the signal from the proximity sensor represents the relative velocity ($v_{rel}$) between the sensor and an object.

Preferably, the signal from the accelerometer is processed by the first processing unit which produces an output when the value exceeds a predetermined threshold and when the relative velocity $v_{rel}$ exceeds a separate predetermined threshold.

Advantageously, the first processing unit which performs the arming algorithm produces an output when the sensed acceleration exceeds a first predetermined threshold and is lower than a second predetermined threshold and when the sensed relative velocity $v_{rel}$ is greater than a first predetermined threshold and lower than a second predetermined threshold.

Conveniently, the output from the accelerometer and the second processing arrangement which performs the crash algorithm compares a function of a and $v_{rel}$, i.e. $f(a, v_{rel})$ with a constant.

Preferably, the function of a and $v_{rel}$ is a function of a multiplied by a function of $v_{rel}$ so that:

$$f(a, v_{rel}) = f_1(a) \cdot f_2(v_{rel}).$$

Alternatively, the function of acceleration and relative velocity is acceleration multiplied by the relative velocity raised to a power q and divided by a time period over which acceleration and relative velocity are measured, so that $$f(a, v_{rel}) = \frac{a \cdot v_{rel}^q}{t}, q > 0$$

BRIEF DESCRIPTION OF THE DRAWINGS

In order that the invention may more readily be understood, and so that further features thereof may be appreciated, embodiments of the invention will now be described, by way of example, with reference to the accompanying drawings in which.

DETAILED DESCRIPTION OF THE INVENTION

Figure 1:
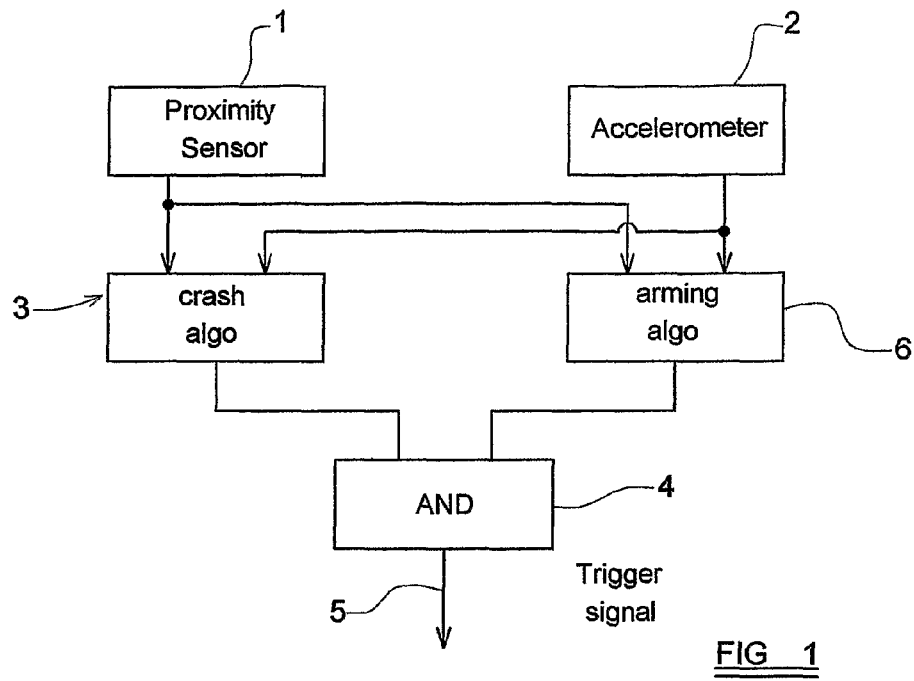
FIG. 1 is a block diagram illustrating one embodiment of the invention.

Referring to FIG. 1 of the accompanying drawings, an arrangement for triggering a vehicle safety device comprises a proximity sensor 1, which is configured to provide an output related to the distance to an object and/or the relative speed between the object and the sensor. The sensor may be for example, an optical sensor or an ultrasonic sensor but in the preferred embodiment of the invention the proximity sensor is a radar sensor. A radar sensor can provide an output related to the distance to an object sensed by the radar by measuring the time delay of the reflected pulse. In one embodiment a doppler radar is used to provide an output indicative of the relative speed between the object and the sensor, by using the doppler effect. The relative speed could also be provided by differentiating the distance.

The arrangement of the invention also includes an accelerometer 2. In the preferred embodiment the accelerometer is especially sensitive to acceleration in a predetermined direction, the accelerometer being oriented so that the predetermined direction is aligned with the direction of a crash which is to be sensed. Thus, if the accelerometer 2 is to sense a frontal impact, the accelerometer is oriented so that the redetermined direction of the accelerometer is aligned with the longitudinal axis of the vehicle. On the other hand, if the accelerometer 2 is to sense a side impact, the accelerometer will be located in position with the said direction aligned with the transverse axis of the vehicle.

The arrangement of the invention also incorporates a first processing unit 3. The processing unit 3 is a unit which is programmed to perform a "crash" algorithm. While the preferred embodiment is described with reference to specific units to perform functions, the functions may be performed in many different ways, for example using processors controlled by appropriate software, by specific hardware structures or by discrete hardware components in integrated circuits like transistors, diodes and capacitors. The first processing unit 3 is connected to receive a signal from the proximity sensor 1 and is also connected to receive a signal from the accelerometer 2. The processing unit 3 has an output which is connected to an AND gate 4, the AND gate 4 having an output 5 which is the trigger signal to trigger the vehicle safety device. Again, while an AND gate 4 is described, the AND function may be achieved in many different ways.

A second processing unit 6 is also provided, the second processing unit 6 again being connected to receive a signal from the proximity sensor 1 and a signal from the accelerometer 2. The second processing unit 6 is a programmed unit which is programmed to perform an "arming" algorithm. The output from the unit 6 is connected to an input to the AND gate 4.

It is to be understood, at this stage, that the AND gate 4 will only produce the trigger signal 5 when it simultaneously receives signals from the first processing unit 3, which performs the arming algorithm, and the second processing unit 6, which performs the crash algorithm.

Thus the crash algorithm and the arming algorithm and the AND function may be realised by separate hardware units as described, or by a single complex hardware unit. Each unit could comprise several discrete components or a single integrated circuit. Alternatively the functionality could be provided by a software controlled processor.

Figure 2:
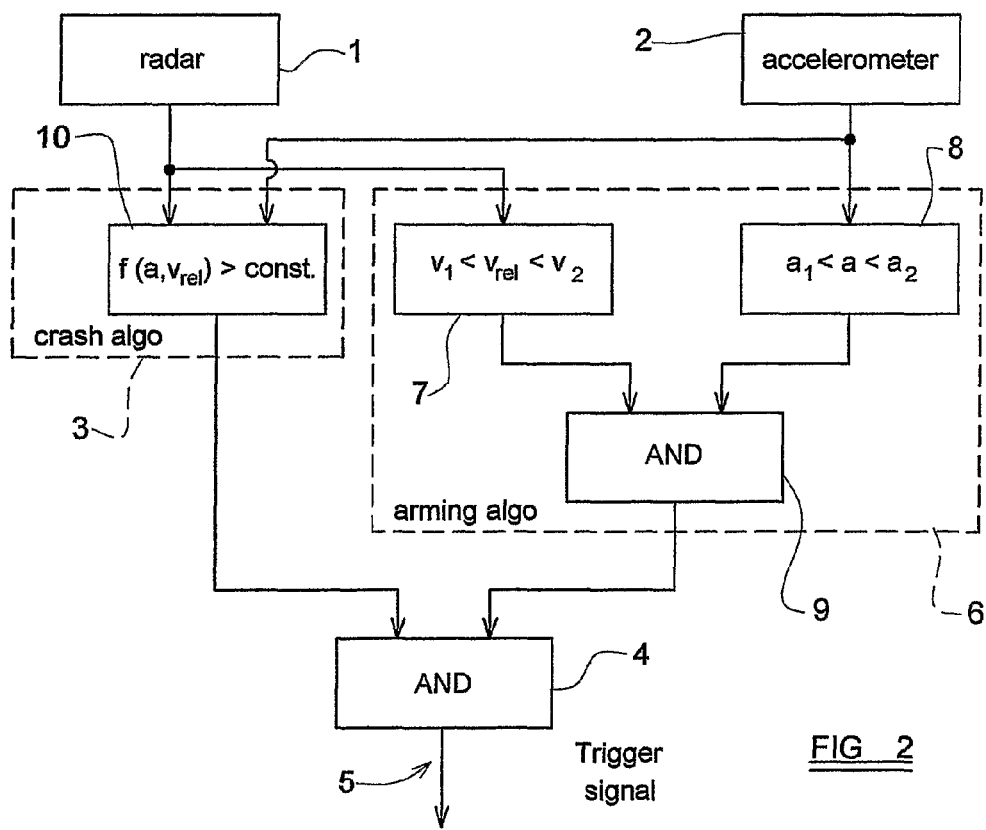
FIG. 2 is a block diagram of a more detailed embodiment of the invention.

Turning now to FIG. 2, a more detailed embodiment will be described. In this embodiment the proximity sensor 1 is a doppler radar, the doppler radar producing an output signal $v_{rel}$, indicative to the relative speed of an external object relative to the sensor in a predetermined direction, for objects within a predetermined distance of the sensor. The accelerometer 2 produces an output signal "a" representative of the acceleration of the sensor.

The second processing unit 6 which performs the arming algorithm receives, consequently, the signals $v_{rel}$ and a. The signal $v_{rel}$ is initially compared with at least a first reference value $v_1$. In the described embodiment the comparison is effected by a comparator 7, but the comparison function may be performed in any way. The comparator 7 will only provide an output if the input signal $v_{rel}$ is greater than the first predetermined value v1. In the described embodiment of the invention, however, the comparator 7 is more sophisticated and will only produce an output signal if $v_{rel}$ exceeds the first reference value v1 but is less than a second reference value v2.

Similarly the signal a from the accelerometer 2 is processed by a comparator 8, and the comparator 8 will only provide an output if the value a is greater than a first reference value $a_1$. Again, while a comparator 8 is described, the comparison function may be performed in any way. In the described embodiment, the comparator 8 is more sophisticated and will only produce an output if the signal a is greater than a first reference value a1 but less than a second reference value $a_2$.

The outputs of the two comparators 7 and 8 present within the first processing unit 3, are passed to an AND gate 9, the output of the AND gate 9 being the output of the second processing unit 6. Again, while an AND gate 9 is described, the AND function may be preferred in any way.

Consequently the second processing unit 6 which performs the arming algorithm will only produce an output signal when the relative velocity sensed by the doppler radar proximity sensor 1 is greater than a predetermined threshold and the acceleration a sensed by the accelerometer 2 is greater than a predetermined threshold but preferably only produces an output when the sensed relative velocity is greater than a first threshold value and lower than the second threshold value and also when the sensed acceleration is greater than a first threshold value and lower than a second threshold value.

The first processor unit 3, which performs the crash algorithm, again receives the signal $v_{rel}$ from the doppler radar proximity sensor 1 and signal a from the accelerometer 2. The first processor unit 3 incorporates a comparator 10 which compares a function of relative velocity and acceleration (f(a, $v_{rel}$) with a constant, only producing an output if the function exceeds the constant. Again, while a comparator 10 is described the comparison function may be performed in any way.

The function utilized within comparator 10 may be a function of acceleration multiplied by a function of relative velocity, thus:

$$f(a,v_{rel})=f_1(a)\cdot f_2(v_{rel}).$$

Alternatively the function may be a more complicated function in which the signal for acceleration a is multiplied by the relative velocity $v_{rel}$ raised to a predetermined power q, greater than zero divided by the period of time over which the acceleration and the relative velocity have been measured. Thus:

$$f(a, v_{rel}) = \frac{a \cdot v_{rel}^q}{t}, q > 0$$

where t is the period of time over which acceleration and relative velocity are measured.

It is to be understood that in the preferred embodiments of the invention the first processing unit 3 and the second processing unit 6 are preferably formed in totally discrete and separate units, which may be separate software-controlled processors, or which may be separate hardware processing units 3, 6, which may, for example, each be mounted on its own separate printed circuit board. This is to minimise the risk of a single fault within a single processor, a single hardware unit or on a single printed circuit board leading to inadvertent failure.

While the above description constitutes the preferred embodiment of the present invention, it will be appreciated that the invention is susceptible to modification, variation and change without departing from the proper scope and fair meaning of the accompanying claims.

What is claimed is:

1. An arrangement for triggering a safety device for a vehicle, the arrangement comprising a proximity sensor configured to provide a proximity signal related to at least one of the distance to an object and the relative velocity between the object and the proximity sensor, an accelerometer, a first processing unit to perform a crash algorithm on the proximity signal received from the proximity sensor and an acceleration signal received from the accelerometer and generating a first signal, and a second processing unit to perform an arming algorithm on the proximity signal and the acceleration signal and generating a second signal, the arrangement generating a trigger signal in response to simultaneous output of the first signal from the first processing unit and the second signal from the second processing unit.

2. An arrangement according to claim 1 wherein the first processing unit and the second processing unit are constituted by separate hardware units.

3. An arrangement according to claim 1 wherein the first processing unit and the second processing unit are constituted by discrete hardware components.

4. An arrangement according to claim 1 wherein the first processing unit and the second processing unit are constituted by integrated circuits.

5. An arrangement according to claim 1 wherein the first processing unit and the second processing unit are each mounted on a respective printed circuit board.

6. An arrangement according to claim 1 wherein the first processing unit and the second processing unit are constituted by separate software controlled processors.

7. An arrangement according to claim 1 wherein the proximity sensor is a radar sensor.

8. An arrangement according to claim 7 wherein the radar sensor is a doppler radar sensor.

9. An arrangement according to claim 1 wherein the accelerometer is sensitive to acceleration in a predetermined direction.

10. An arrangement according to claim 9 wherein the proximity sensor is oriented to determine the distance in the predetermined direction to the object.

11. An arrangement according to claim 10, wherein the predetermined direction of the accelerometer being aligned with the longitudinal axis of the vehicle.

12. An arrangement according to claim 9, wherein the predetermined direction of the accelerometer is parallel with the lateral axis of the vehicle.

13. An arrangement according to claim 1, wherein the proximity signal from the proximity sensor represents the relative velocity between the proximity sensor and the object.

14. An arrangement according to claim 13 wherein the acceleration signal from the accelerometer represents an acceleration and the first processing unit produces the first signal when the acceleration exceeds a first predetermined threshold and when the relative velocity exceeds a second predetermined threshold.

15. An arrangement according to claim 9 wherein the second processing unit which performs the arming algorithm produces the second signal when the acceleration exceeds a first predetermined acceleration threshold and is lower than a second predetermined acceleration threshold and when the relative velocity is greater than a first predetermined velocity threshold and lower than a second predetermined velocity threshold.

16. An arrangement according to claim 13 wherein the acceleration signal from the accelerometer represents an acceleration and the second processing unit which performs the crash algorithm compares a function of the acceleration and the relative velocity with a constant.

17. An arrangement according to claim 16 wherein the function of the acceleration and the relative velocity is a function of the acceleration multiplied by a function of the relative velocity so that $$f(a,v_{rel})=f_1(a)\cdot f_2(v_{rel})$$

where a is the acceleration and $v_{rel}$ is the relative velocity.

18. An arrangement according to claim 16 wherein the function of the acceleration and the relative velocity is the acceleration multiplied by the relative velocity raised to a power q and divided by a time period over which the acceleration signal and the relative velocity are measured, so that $$f(a, v_{rel}) = \frac{a \cdot v_{rel}^q}{t}, q > 0$$

where a is the acceleration $v_{rel}$ is the relative velocity, q is the power to which the relative velocity is raised, and t is the period of time over which the acceleration signal and the relative velocity are measured.

* * * * *